United States Patent [19]

Ott et al.

[11] 4,009,226

[45] Feb. 22, 1977

[54] ABS MOULDING COMPOSITIONS

[75] Inventors: Karl-Heinz Ott; Gert Humme, both of Leverkusen; Dietmar Kranz, Cologne; Harry Rohr, Gross Koenigsdorf, all of Germany

[73] Assignee: Bayer Aktiengesellschaft, Germany

[22] Filed: Apr. 22, 1975

[21] Appl. No.: 570,350

[30] Foreign Application Priority Data

Apr. 26, 1974 Germany .................. 2420358

[52] U.S. Cl. .................. 260/876 R; 260/880 R
[51] Int. Cl.² .................. C08L 55/02
[58] Field of Search .................. 260/876 R

[56] References Cited

UNITED STATES PATENTS

| | | | |
|---|---|---|---|
| 3,509,237 | 4/1970 | Aubrey et al. | 260/880 R |
| 3,509,238 | 4/1970 | Aubrey et al. | 260/876 R |

Primary Examiner—Carman J. Seccuro
Attorney, Agent, or. Firm—Connolly and Hutz

[57] ABSTRACT

Moulding compositions containing

A. 6 to 30 parts by weight of graft polymer obtained by grafting 20 to 60 parts by weight of a mixture of styrene and acrylonitrile in a ratio by weight of 95 : 5 to 60 : 40 onto 80 to 40 parts by weight of polybutadiene or a butadiene copolymer with a butadiene content of at least 30% with an average particle diameter of 0.26 to 0.65 $\mu$ and a grafting degree of 0.15 to 0.7;

B. 14 to 45 parts by weight of a graft polymer obtained by polymerizing 40 to 60 parts by weight of a mixture of styrene and acrylonitrile in a ratio by weight of 95 : 5 to 60 : 40 onto 60 to 40 parts by weight of polybutadiene or a butadiene copolymer with a butadiene content of at least 30%, with an average particle diameter of 0.05 to 0.25 $\mu$ and a grafting degree of 0.4 to 0.9; and C. 25 to 80 parts by weight of a copolymer of styrene and/or $\alpha$-methyl styrene on the one hand and acrylonitrile on the other hand in a ratio by weight of 80 : 20 to 60 : 40 and an average molecular weight (mean weight) $M_w$ of 50,000 to 200,000 and a molecular heterogeneity of U = 4.5 to 1.0.

6 Claims, No Drawings

ABS MOULDING COMPOSITIONS

This invention relates to thermoplastic moulding compositions of the ABS-type with improved properties as compared to known ABS-moulding compositions, especially good toughness ready processibility and high surface gloss. The name "ABS" derives from the monomers acrylonitrile, butandiene and styrene (or homologues thereof) of which these moulding compositions are made.

ABS-moulding compositions are two-phase plastics; they constitute a microheterogeneous polymer mixture. An elastomeric material based on butandiene, styrene, acrylonitrile is dispersed as the discontinuous phase in a thermoplastic styreneacrylonitrile copolymer as matrix, hereinafter also referred to as resin matrix, SAN-matrix or SAN-resin. Wheere the inner discontinuous phase is a graft polymer of styrene and acrylonitrile ("SAN") on a butandiene hol- or copolymer ("graft base"), the graft polymer becomes as ABS-graft polymer.

The physical properties of ABS-graft polymers are only partially derived from the properties of their two polymer components. The most important properties derive from the two phase structure consisting of a rubber phase embedded in a hard and brittle thermoplastic matrix.

For example, toughness and surface gloss are inversely influenced by particle size and structure of the rubber phase and the quantity in which it is present in the moulding composition. IF an ABS-graft polymer with a grafting degree[2] G of $\geq 0.6$ ("G-value", "actual degree of grafting") for an average particle diameter [1] of 0.1 $\mu$, is dispersed in the resin matrix, the moulding composition obtained is of moderate toughness but of high surface gloss irrespective of its ABS-graft polymer content (and hence its rubber content). With a grafting degree G of the graft polymer of 0.2, the moulding composition obtained has a high toughness, but a dull surface because the ABS-graft polymer particles with an incomplete grafting shell agglomerate during thermoplastic processing to form particles with a diameter of $\geq 1.0$ $\mu$, so that the surface of the moulding shows macroscopic irregularities which scatter light to a considerable extent and, hence, appear dull.

[1] Ultracentrifuge measurements (cf. W. Scholtan, H. Lange, Kolloid Z. and Z. Polymere 250 (1972) 782,796), or measurements by electron microscopy, followed by particle counting (cf. G. Kâmpf, H. Schuster; Angew. Makromolekulare Chemie 14 (1970) 111–129). Particle diameter always means the $d_{50}$-value.

[2] The grafting degree G(G-value) is the ratio "SAN" grafted/spine a dimensionless number.

With average particle diameters of from 0.35 to 0.5 $\mu$, it is possible to establish a compromise between toughness and surface gloss when the ABS-graft polymers have a G-value of from 0.20 to 0.7. Since the particle diameters are still above half the wavelength of visible light, the scattering effects which occur are greater than in the case of ABS-graft polymers whose inner phase has an average particle diameter of, for example, 0.1 $\mu$ and a high grafting degree.

Another possibility for a compromise between toughness and surface gloss is shown in German Offenlegungsschrift Nos. 1,745,098 and 1,745,097, where two different ABS-graft polymers are simultaneously incorporated into one SAN-matrix. German Offenlegungsschrift No. 1,745,098 discloses a combination of a graft polymer with an average particle size of $>0.8\mu$ and a graft polymer with an average particle size of $<0.25\mu$, German Offenlegungsschrift No. 1,745,097 discloses a combination of a graft polymer, in which from 5 to 35 parts, by weight, of styrene and acrylonitrile are grafted onto 100 parts, by weight, of spine, and a graft polymer with a monomer: base ratio of from 50 to 250: 100.

In both cases, the required improvement in gloss is at the expense of thoughness. By way of compromise in the first case, only part of the graft polymer has an average particle size of $>0.8/\mu$ and in the second case only part of the graft polymer a G-value of $>0.25$.

The SAN-matrix itself also influences the properties of ABS-moulding compositions because:
1. toughness is reduced and processibility and surface gloss improved with increasing content of SAN-resin; and 2 toughness increases and processibility and surface gloss deteriorate with increasing molecular weight of the SAN-resin.

Accordingly, here a compromise is necessary, too, in order to optimise toughness, processibility and surface gloss.

ABS-moulding compositions, which contain a high amount of graft polymer with a small particle size and SAN-resin of low molecular weight, exhibiting good toughness, good processing properties and high gloss, have never before been found.

The present invention relates to ABS-graft copolymers with improved toughness, processibility and high surface gloss of:

A. 6 to 30 parts, by weight, of graft polymer obtained by grafting 20 to 60 parts, by weight, of a mixture of styrene and acrylonitrile in a ratio, by weight, of 95 : 5 to 60 : 40 onto 80 to 40 parts, by weight, of polybutadiene or a butadiene copolymer with a butadiene content of at least 30%, with an average particle diameter of 0.26 to 0.65 $\mu$ and a grafting degree of 0.15 to 0.7;

B. 14 to 45 parts, by weight, of a graft polymer obtained by polymerising 40 to 60 parts, by weight, of a mixture of styrene and acrylonitrile in a ratio, by weight, of 95 : 5 to 60 : 40 onto 60 to 40 parts, by weight, of polybutadiene or a butadiene copolymer with a butadiene content of at least 30%, with an average particle diameter of 0.05 to 0.25 $\mu$ and a grafting degree of 0.4 to 0.9; and C. 25 to 80 parts, by weight, of a copolymer of styrene and/or $\alpha$methyl styrene on the one hand and acrylonitrile on the other hand in a ratio, by weight, of 80 : 20 to 60 : 40 and an average molecular weight (means weight) $M_w$ of from 50,000 to 200,000 and a molecular heterogeneity [3] of U = 4.5 to 1.0. Preferred ABS-graft copolymers consist of:

[3] Molecular heterogeneity $$U = \frac{M_w}{M_n} - 1$$

$M_w$ = weight average of the molecular weight
$M_n$ = numerical average of the molecular weight A. 6 to 30 parts, by weight, of a graft polymer of 25 to 50 parts, by weight, of a mixture of styrene and acrylonitrile in a ratio, by weight, of 88 :12 to 60 : 40 on 75 to 50 parts, by weight, of a butadiene homoor co-polymer with a butadiene content of $\geq$ 70%, and average particle diameter of 0.3 to 0.55 $\mu$ and a grafting degree of 0.25 to 0.70;

B. 14 to 45 parts, by weight, of a graft polymer of 40 to 60 parts, by weight, of a mixture of styrene and acrylonitrile in a ratio, by weight, of 88 : 12 to 60 : 40 on 60 to 40 parts, by weight, of a butadiene homo- or co-polymer with a butadiene content of >70%, a particle diameter of 0.08 to 0.15 $\mu$ and a grafting degree of 0.6 to 0.8;

C. 25 to 80 parts, by weight, of a copolymer of styrene and/or $\alpha$-methyl styrene of the one hand and acrylonitrile on the other hand in a ratio, by weight, of 75 : 25 to 60 : 40, with an average molecular weight $M_w$ of 60,000 to 160,000 and a molecular heterogeneity U of 4.0 to 1.0.

The butadiene polymer in component (A) is, with particular preference, a butadiene homopolymer with an average particle diameter of from 0.03 to 0.05 $\mu$ and a gel content of $\geq$ 85% (as measured in methylethylketone or toluene). A monomer to spine ratio of 45 : 55 to 35 : 65 is preferably maintained during grafting, and the G-value reached during grafting reaction is from 0.33 to 0.05.

In another particular embodiment, the graft polymer (B) is also based on a butadiene homopolymer, the spine base has a gel content of $\geq$85% and a G-value of from 0.06 to 0.08 is reached during the grafting reaction.

Preferred SAN-resins have a styrene to acrylonitrile ratio (by weight) of from 75 : 25 to 66 : 34, the weight average of the molecular weight should be from 70,000 to 140,000 and the molecular heterogeneity U should not be any greater than 3.

The moulding compositions according to the invention may be produced by known methods. The following methods are mentioned by way of example: emulsion polymerisation and solution polymerisation for preparation of the spine; emulsion polymerisation and suspension polymerisaiton for preparation of the graft polymers; solution, suspension, bulk or emulsion polymerisation for preparation of the SAN-resin. The process conditions should be such that the critical product parameters defined above are maintained.

The SAN-resin

The SAN-resin preferably consists of copolymers of styrene with acrylonitrle in a ratio, by weight, of 75 : 25 to 66 : 34. The weight average of the molecular weight $M_w$, for example determined by light scattering or by the ultracentrifuge, is from 50,000 to 200,000 and preferably from 60,000 to 160,000. The number average of the molecular weight $M_n$, as determined, for example, by osmotic measurements, must be so that the molecular heterogeneity:

$$U = \frac{M_w}{M_n} - 1$$

is from 1.0 to 4.5. For example, $M_n$ (number average of the molecular weight) has to be 27,500 at $M_w = 68,000$ to yield a molecular heterogeneity U of 1.5.

Ways to obtain SAN-resins with the required properly are, for example:

1. emulsion polymerisation with continuous addition of emulsifier and monomer, in the presence of molecular weight regulators; narrow residence time distribution in the reactor; and 2. bulk, solution or emulsion polymerisation to low conversion, followed by monomer recovery and isolation of the solid polymer.

In the preferred embodiment, the SAN-resin contains the monomer units of styrene and acrylonitrile in a ratio, by weight, of 75 : 25 to 66 : 34. The styrene may be replaced either completely or partially by $\alpha$-methyl styrene; copolymers with the ratio, by weight, 69 : 31 are particularly favourable.

The styrene may even by completely or partially replaced by other monomers, or the acrylonitrile content increased to beyond 60 %, by weight, in conjunction with other monomers. Accordingly, the following polymers, for example, are also suitable SAN-resins: terpolymers of terpolymers of styrene and acrylonitrile with $\alpha$-olefins and terpolymers of acrylonitrile with acrylic acid esters and $\alpha$-olefins.

The styrene may also be replaced by stryenes substituted in the nucleus (e.g. vinyl toluene) or side chain, (e.g. $\alpha$-methyl styrene), whilst acrylonitrile may be replaced by methacrylonitrile.

In cases where the SAN-resin is prepared by emulsion polymerisation, it is possible to use the conventional emulsifiers, for example alkyl sulphates, alkyl sulphonates, aryl alkyl sulphonates, the alkali metal salts of saturated or unsaturated fatty acids and the alkali metal salts of disproportionated or hydrogenated abietic or tall oil acids Suitable activators, include standard commercial-grade organic and inorganic peroxides, inorganic persulphates and redox systems, i.e. activator systems consisting of an oxidising agent and a reducing agent, heavy metal ions additionally being present in the reaction medium.

The molecular weights may be adjusted with conventional molecular weight regulators, generally relatively long-chain alkyl mercaptans (e.g. dodecylmercaptane) or terpinolenes or with $\alpha$-olefins.

In cases where polymerisation is carried out in solution aromatic hydrocarbons may be used as solvents and organic peroxides or azo-compounds as activators. No solvents are used in the case of bulk polymerisation. When polymerisation is only continued to a certain conversion level, the unreacted monomers and solvent may be removed from the solid polymer, for example, by evaportation in a screw or, in the case of emulsion polymerisation, even in a thin-layer evaporator.

In cases where the styrene-acrylonitrile copolymers are prepared by suspension polymerisation, it is possible to use the conventional suspension stabilisers, for example, polyvinyl alcohol and partially hydrolysed polyvinyl acetate.

The graft bases

In order to comply with the stipulations regarding particle size, highly specific reaction conditions and polymerisation techniques have to be used in the preparation of the spines.

For example, a "large particle size" of from 0.3 to 0.6 $\mu$ may be prepared by emulsion polymerisation iwth a low water : monomer ratio and staggered addition of the emulsifier, whereas, by contrast, a "small particle size" polybutadiene latex with a particle diameter [4] of 0.05 to 0.15 $\mu$ requires a high concentration of emulsifier to begin with and a high water : monomer ratio.

[4] $d_{50}$-value, measured in an ultracentrifuge.

In principle, a latex with a particle size of 0.5 to 0.6 μ may also be obtained by particle agglomeration from a fine-particle latex.

The process by which the spines are prepared is preferably controlled in such a way that highly crosslinked products are obtained. The gel content should preferably be > 85 % (as measured in methylethylketone or toluene). In the case of high butadiene contents, this degree of preferably be >85% (as measured in methylethylketone or toluene). In the case of high butadiene contents, this degree of crosslinking may be obtained by continuing polymerisation to high conversion levels or by using crosslinking agents, i.e. polyfunctional monomers, such as divinyl benzene and ethylene glycol dimethacrylate.

According to the invention, the spines of graft polymers (A) and (B) should have an average particle diameter [4] of from 0.26 to 0.65 and from 0.05 to 0.25 μ, respectively.

In principle, solid rubbers which have been obtained from their solutions in organic solvents may also be used for producing in coarse-particle graft polymers. However, it is necessary in this case to carry out the graft polymerisation reaction, for example, in the form of a bulk/suspension polymerisation reaction under such reaction conditions as will produce the critical particle size.

In cases where the spines are prepared by emulsion polymerisation, the emulsifiers, activators, and polymerisation auxiliaries used for production of the SAN-resins may again be employed. Before the grafting reaction, the spines should be degassed in order to supress undesirable crosslinking reactions inititated by unreacted monomer.

It is preferred to use polybutadiene homopolymers or butadiene copolymers with a butadiene content of at least 60%, by weight, as spine in cases where a so-called "resin forming monomer" is used as the comonomer. Where other dienes, for example, isoprene, or the lower alkyl esters of acrylic acid, are used as comonomers, the butadiene content of the spine may be reduced to 30%, by weight, without incurring any disadvantages in regard to the properties of the moulding composition. In principle, it is also possible to produce the moulding compositions according to the invention from saturated spines, for example, ethylene-vinyl acetate copolymers with a vinyl acetate content of less than 50% or ethylene-propylene-diene terpolymers. (The diene is usually non-conjugated, e.g. 1,5-hexadiene, ethylidene-norbornene, dicyclopentadiene).

The graft polymers

The graft polymers are obtained by polymerising the graft monomers in the presence of the particular spine using the graft monomer : spine ratios indicated above. The grafting degree G can be varied by appropriate selection of spine and by the ratio of spine to graft monomer.

Low grafting degrees are obtained and where the ratio of spine to graft monomers is high and where the spine to graft monomers is high and where the sprine has a large average particle diameter. High grafting degrees are obtained where the ratio of spine to graft monomers is ≦ 1 : 1 and the particle size of the spine is small, in other words the grafting degrees which can be obtained are dependent on the particle size of the graft polymer and the choice of the graft monomers : spine ratio.

For a given spine, the grafting degree can also be adjusted otherwise, for example, by adding chain transfer agents, such as long-chain mercaptans and αolefins, through the type and quantity of suspension stabilisers or emulsifiers, through the type and quantity of activator or even through particular processes, for example, the so-called "continuous monomer addition" process.

Grafting reactions generally do not produce 100% grafting. Accordingly, it is also possible by varying the grafting degree to influence the properties of the grafting degree to influence the properties of the copolymer formed as secondary product during the grafting reaction.

With a graft monomer to spine ratio of >1 : 1, it is possible to produce part or even all the SAN-resin during the grafting reaction, for example, the fine-particle graft polymer may be prepared at the same time as the SAN-resin, provided that the reaction conditions are selected in such a way that both have the properties described above.

The graft polymers can be obtained by various processes although they are preferably obtained by subjecting the graft monomers to emulsion polymerisation in the presence of a spine obtained by emulsion polymerisation.

It is also possible to suspend a graft polymer obtained by emulsion polymerisation with a small particle size and a low G-value, either in latex form or in the form of a solid polymer, in a SAN-monomer mixture, followed by another grafting reaction in the form of a suspension polymerisation reaction. A graft polymer and the styrene-acrylonitrile copolymer required for the polyblend may be simultaneously produced in dependence either upon the ratio of the starting graft polymer to the styrene-acrylonitrile monomer mixture or upon the addition of regulator.

In cases where the graft polymers as a whole are produced by emulsion polymerisation, the observations made in reference to production of the resin matrix again apply. Alternatively, the large particle size graft polymer may even be produced from a soluble rubber, bead polymerisation being carried out after a bulk polymerisation stage followed in turn by phase inversion. The reaction conditions used for the bead polymerisation reaction are the same as those generally known for suspension polymerisation reactions.

It is preferred to produce the graft polymers by emulsion polymerisation.

Graft polymer characteristic

The structure of the two graft polymers is critical so far as the properties of the moulding composition are concerned. If the limits specified are exceeded, the properties change, for example toughness decreases or processibility deteriorates.

According to the invention, the graft polymer (A) has a G-value of 0.15 to 0.70 for an average particle diameter of 0.26 to 0.65 μ, the side chains grafted on having an average molecular weight (weight average) $M_w$ of 20,000 to 140, 000.

Preferably, the G-value of the graft polymer (A) is from 0.35 to 0.55 and the molecular weight $M_w$ of the grafted-on side chains from 60,000 to 80,000.

The graft polymer (B) has a G-value of from 0.4 to 0.9. The side chains grafted on have an average molecular weight (weight average) of from 15,000 to 200,000.

Preferably, the G-value of graft polymer (B) is from 0.6 to 0.8 and the molecular weight ($M_w$) of the grafted-onside chains from 20,000 to 60,000

The moulding compositions

The two graft polymers can be mixed with the SAN-resin in different ways. In cases where, for example, all three components are prepared by emulsion polymerisation, the latices may be mixed. If, for example, the styrene-acrylonitrile copolymer is prepared by bulk or solution polymerisation and the graft polymers by emulsion polymerisation, mixing has to be carried out in a mixing machine (multiroll stand, mixing extrude or internal kneader). This is also the case where, for example, two of the components are prepared in one process stage and the third components are prepared in one process stage and the third component accumulating in powder or granulate form has to be combined with the component mixture.

The proportion of graft polymers in the moulding composition is limited to at most 75%, by weight, although the proportion of actual graft polymers is lower because not all the monomers have been grafted.

Preferred moulding compositions have the following composition:

| | |
|---|---|
| Graft polymer (A): | 6 – 22 parts, by weight; |
| Graft polymer (B): | 14 – 38 parts, by weight; |
| SAN-resin (C): | 40 – 80 parts, by weight; |

(A) having a G-value of from 0.26 to 0.65 and
(B) having a G-value of from 0.60 to 0.8.

Graft polymer combinations in which graft polymer (A) makes up less than 45% of the graft polymer total, and graft polymer combinations in which the quantity of spine introduced through graft polymer (A) is less than 50% of the total quantity of spine in the moulding composition, are also preferred.

The moulding compositions according to the invention can have added to them during recovery, further processing and final shaping the additives required for or expedient to those stages, such as antioxidants, UV-stabilisers, hydroperoxide eliminators, antistatic agents, lubricants, flameproofing agents, fillers or reinforcing materials (glass fibres or carbon fibres) and colourants.

Final shaping can be carried out in the conventional machines and comprises, for example, injection moulding, sheet extrusion followed by heat forming, cold forming of films, the extrusion of tubes and profiles and calender processing.

The definitions used in the description are summarised in the following:

| | |
|---|---|
| Particle diameter: | $d_{50}$-value determined by ultracentrifuge measurement or elctron microscopy. |
| Grafting degree: degree of grafting | G-value; grafting degree: ratio, by weight, of the monomers actually grafted onto a spine to the spine. |
| Matrix, resin matrix, SAN-matrix, SAN-resin: | Copolymer of styrene and/or α-methyl styrene on the one hand and acrylonitrile on the other hand, in which the graft polymer(s) is/are distributed. |
| Graft polymer: | The product of polymerisation of graft monomers in the presence of a spine. |
| Graft monomers: | Styrene (α-methyl styrene) and acrylonitrile. |
| Spine (grafting base; substrate; grafting spine): | Butadiene homo- or co-polymer. |

Molecular heterogeneity $$U = \frac{M_w}{M_n} - 1,$$

$M_w$ = weight average of the molecular weight,
$M_n$ = numerical average of the molecular weight.

Parts in the following Examples are parts by weight unless otherwise stated.

EXAMPLES

A. Preparation of the spines:

The spines are obtained in latex form in accordance with the general formulation by emulsion polymerisation in pressure reactors at 55° to 68° C. Any particle sizes in range of from 0.05 to 0.65 μ may be adjusted by varying the ratio of water to monomer, the quantity of activator or emulsifier added and the type of emulsifier dosage.

| General formulation. | Parts, by weight |
|---|---|
| Deionised water | 60.0 – 200.0 |
| Emulsifier[1], total | 1.5 – 7.5 |
| normal (n/1) NaOH | 0.5 – 10.0 |
| Potassium persulphate | 0.3 – 1.0 |
| Butadiene | 30.0 – 100.0 |
| Comonomers | 0.0 – 70.0 |
| n-dodecyl mercaptan | 0.1 – 0.5 |
| Cross-linking agent[2] | 0.0 – 0.5 |

[1]Emulsifiers are preferably the Na-salts of disproportionated abietic acid or of fatty acids and n-alkyl sulphonates.
[2]Divinyl benzene.

Particular formulations for the preparation of polybutadiene latices:

| | Latex | | |
|---|---|---|---|
| | A-1 | A-2 | A-3 |
| Deionised water | 68.0 | 100.0 | 200.0 |
| Emulsifier[1], total | 2.0 | 2.0 | 5.0 |
| in first stream | 0.5 | 0.5 | 5.0 |
| added in portions afterwards | 1.5 | 1.5 | — |
| Butadiene | 100.0 | 100.0 | 100.0 |
| n-dedecyl mercaptan | 0.4 | 0.4 | 0.4 |
| Final concentration | 59.4 % | 49.7 % | 32.8 % |
| $d_{50}$-value, ultracentrifuge-measurement (/μ) | 0.40 | 0.25 | 0.10 |

[1]Na-salt of disproportionated abietic acid or Na-stearate.

Polymerisation is continued up to a conversion of > 95% and unreacted butadiene removed from the latex by degassing. In processed form, the polymers have a gel content of ≧ 85%.

Latex A-4 was produced in the same way as latex A-1 and latex A-5 in the same way as latex A-3:

| Latex | Monomers (parts by weight) | Particle size $d_{50}$-value, ultracentrifuge-measurement (/μ) | Final concentration (%) |
|---|---|---|---|
| A-4 | 90 Butadiene + 10 Styrene | 0.38 | 59.3 |
| A-5 | 90 Butadiene + | 0.12 | 32.6 |

-continued

| Latex | Monomers (parts by weight) | Particle size $d_{50}$-value, ultracentrifuge-measurement ($/\mu$) | Final concentration (%) |
|---|---|---|---|
| | 10 Styrene | | |

The following latex was prepared in the same way as latex A-3 using 2.5 parts, by weight, of Na-alkyl sulphonate (n-alkyl radical $C_{12}-C_{18}$):

| Latex | Monomers (parts, by weight) | Particle size $d_{50}$-value, ultracentrifuge-measurement ($/\mu$) | Final concentration (%) |
|---|---|---|---|
| A-6 | 30 Butadiene + 70 Butyl-acrylate | 0.08 | 32.5 |

B. Preparation of the graft polymers

The graft polymers were prepared by emulsion polymerisation in accordance with the general formulation:

| General formulation | Parts, by weight |
|---|---|
| Spine (solid polymer) | 80 – 40 |
| Deionised water | 150 – 200 |
| Emulsifier[1] | 0.0 – 5.0 |
| Graft monomers | 20 – 60 |
| Potassium persulphate | 0.3 – 1.0 |
| Tert.-dodecyl mercaptan | 0.0 – 1.0 |

[1]Preferably the alkali metal salts of disproportionated abietic acid or n-alkyl sulphonates Polymerisation temperature: 60° – 75° C
Apparatus: standard apparatus equipped with stirrer, condenser and measuring vessels
Polymerisation process governed by degree of grafting to be adjusted
Batch operation or continuous operation with emulsifier and/or monomer run in continuously.

| Particular formulation | I g | II g |
|---|---|---|
| Spine latex A 3 (35.4 %) | 2120 | 2260 |
| Deionised water | 1630 | 540 |
| Solid polymer in latex A 3 | 750 | 800 |
| Na-alkyl sulphonate | 15 | 8 |
| Potassium persulphate | 7.5 | 3 |
| Styrene + acrylonitrile (ratio, by weight, 70 : 30) | 750 | 200 |

The formulations contain in parts, by weight

| | I | II |
|---|---|---|
| Deionised water | 200 | 200 |
| Graft base (solid) | 50 | 80 |
| Na-alkyl sulphonate | 1.0 | 0.8 |
| Potassium persulphate | 0.5 | 0.3 |
| Styrene + acrylonitrile | 50 | 20 | some of the water emanating from the latex and the rest being added.

The spine is initially introduced in latex form and the potassium persulphate introduced in solution in a large portion of the deionised water. The solution of the emulsifier in 25 parts, by weight, of deionised water and the monomer mixture are run in through dropping funnels. The run-in time is 4 hours in each case, the total polymerisation time is 8 hours and the reaction temperature is adjusted to 65° C. The polymerisation conversion should amount to more than 97%.

The following graft polymers were prepared in accordance with this specification:

Graft Polymers

| Name | Spine name | Composition of the spine monomer units in % by weight (1) Bu | S | AB | Particle diameter in $\mu$ | Graft polymer Ratio by weight of spine to graft monomer | Graft monomer ratio by weight of styrene to acrylonitrile | G-value |
|---|---|---|---|---|---|---|---|---|
| B-1 | A-3 | 100 | | | 0.1 | 50 : 50 | 70 : 30 | 0.72 |
| B-2 | A-3 | 100 | | | 0.1 | 80 : 20 | 80 : 20 | 0.06 |
| B-3 | A-1 | 100 | | | 0.4 | 60 : 40 | 70 : 30 | 0.43 |
| B-4 | A-1 | 100 | | | 0.4 | 60 : 40 | 88 : 12 | 0.45 |
| B-5 | A-1 | 100 | | | 0.4 | 65 : 35 | 80 : 20 | 0.36 |
| B-6 | A-4 | 90 | 10 | | 0.38 | 70 : 30 | 70 : 30 | 0.32 |
| B-7 | A-5 | 90 | 10 | | 0.12 | 50 : 50 | 70 : 30 | 0.75 |
| B-8 | A-2 | 100 | | | 0.25 | 65 : 35 | 70 : 30 | 0.39 |
| B-9 | A-6 | 30 | | 70 | 0.08 | 50 : 50 | 70 : 30 | 0.80 |
| B-10 | A-1 | 100 | | | 0.4 | 80 : 20 | 66 : 34 | 0.10 |

(1) Bu = butadiene units, S = styrene units, AB = acrylic acid butyl ester units

(C) Preparation of the SAN-copolymers

C 1) Emulsion polymerisation

Apparatus

Reactor cascade of 4 glass reactors each with a capacity of 0.5 litres. Each reactor is thermostatically controlled and equipped with an MIG-stirrer, thermometer, condenser and an overflow tube which leads from the bottom of the first reactor to the upper edge of the following reactor.

Reaction

The following streams are introduced through metering pumps into reactor 1:
a. 444 cc/h of a solution of 2.0 parts, by weight, of the Na-salt of a disproportionated abietic acid and 0.3 parts, by weight of potassium persulphate in 150 parts, by weight, of deionised water;
b. 338 cc/h of a mixture of 70 parts, by weight, of styrene, 30 parts, by weight, of acrylonitrile and 0.3 parts, by weight, of tert.-dodecyl mercaptan. The polymerisation temperature is 65° C and the average residence time 2.6 h. The conversion is in excess of 95%.

Copolymer characteristic

The viscosity average of the molecular weight (weight average) amounts to 97,000 (as measured in DMF at 20° C), and the molecular heterogeneity U amounts to 1.6 for a number average of the molecular weight of 37,000.

C 2) Bulk polymerisation

Apparatus 36 litre capacity V4A-reactor equipped with a wall-sweeping anchor stirrer. Monomer inlet tube at the bottom of the reactor; product outlet tube at the upper end of the reactor; condenser and thermometer.

Polymerisation 57 1/h of a mixture of 75 parts, by weight, of styrene, 25 parts, by weight, of acrylonitrile and 0.1 parts, by weight, of tert.-dodecyl mercaptan are "run" into the reactor through a metering pump. This corresponds to an average residence time of 0.63 h. The polymerisation temperature is adjusted to 140° C. Polymerisation is continued to a conversion of 25%. The polymer solution formed is continuously removed and passed through a thin-layer evaporator, the monomer recovered is returned to the reaction and the polymer isolated is removed through a discharge extruder.

Copolymer characteristic

The product obtained by the method described above has the following characteristics:
Weight average of the molecular weight $M\eta \approx 86,000$ (DMF, 20° C)
$M_n = 42,000$, $U = 1.2$

D) Production of the moulding compositions

D 1) By joint precipitation of the latices when all the components are prepared by emulsion polymerisation and accumulate in the form of latices.
Corresponding latices containing:
x parts, by weight, of graft polymer (A)
y parts, by weight, of graft polymer (B)
z parts, by weight, of styrene-acrylonitrile copolymer (C)
are mixed and the mixture coagulated with magnesium sulphate following the addition of 1.0 part, by weight, (based on 100 parts, be weight, of solid polymer) of a phenolic antioxidant (2,6-di-tert.-butyl-p-cresol, added through a 25% oil-in-water emulsion). After washing, the resulting powder is dried at 70° C in a vacuum drying cabinet.

D 2) By mixing powder and granulate when, for example, the SAN-resin is in the form of a granulate (bulk polymerisation) and the two graft polymers are in the form of powders (emulsion polymerisation) and working-up in accordance with D 1), the components are mixed at 140° to 200° C in a double-screw extruder or in an internal kneader, the resulting moulding composition is run off in band form and subsequently granulated.

E) Production of the test specimens

E 1) From the moulding composition in powder form

Following the addition of 1.5 parts, by weight, of the bis-stearyl amide of ethylene diamine (1.5 parts, by weight/100 parts, by weight, of polymer), the powder is processed into a rough sheet on a two-roll stand and the rough sheet thus obtained granulated. Standard small test bars are subsequently injection-moulded from the granulate at 220° C.

E 2) From the moulding composition in granulate form by injection moulding as in E 1)

F) Test methods

F 1)

The DIN standard methods for determining notched impact strength, impact strength and hardness, flexural strength and dimensional stability to heat according to Vicat.

F 2)

The melt index according to DIN 53 753, expressed in g/10 minutes (temperature 220° C, 10 kg load), for determining processibility.

F 3)

A visual test for determining gloss. 2%, by weight, of carbon black and 2%, by weight, of the bis-stearyl amide of ethylene diamine are added to the moulding composition, and a test specimen (spring cup) produced by injection moulding under different pressures at 240° C. The underneath of the test specimen is substantially flat, whilst its upper surface has a number of stiffening ribs of different height.

It is possible, on the flat side of the test specimen, to detect the places in which the ribs are situated on the other side because the material "contracts" there and because the gloss differs from that of the other areas.

The injection pressure is first changed in such a way that no contractions occur, so that only differences in gloss are observed.

A test specimen of a styrene-acrylonitrile copolymer with a molecular weight of approximately 200,000 (as determined by measuring viscosity in DMF at 20° C) has completely identical colour shades and gloss retention over its entire surface and serves as standard. This gloss level is denoted as H.
G corresponds to a barely recognisable difference in gloss,
F corresponds to a distinctly recognisable difference in gloss,
E corresponds to an average difference in gloss,
D corresponds to a marked difference in gloss,
C corresponds to a very marked difference in gloss.

Gloss level C is generally reached in standard commercialgrade ABS-polymers.

The test specimens can be classified according to their gloss levels by various people without any argument whatever. Visual assessment is as reliable as optical measurements (interference measurements).

EXAMPLES 1 to 3

Moulding compositions of the following compositions are prepared in accordance with D 1) from:
a. graft polymer B-3
b. graft polymer B-1 c. a styrene-acrylonitrile copolymer of 70 parts, by weight of styrene and 30 parts, by weight, of acrylonitrile, prepared according to C-1 with the copolymer characteristic $M_\eta = 77{,}000$; $U = 1.6$; $M_n = 32{,}000$:

| Example | 1 | 2 | 3 |
|---|---|---|---|
| Graft polymer B-3 (parts, by weight) | 11.5 | 9.0 | 17.8 |
| Graft polymer B-1 (parts, by weight) | 20.0 | 14.2 | 28.6 |
| SAN-copolymer (parts, by weight) | 68.5 | 76.8 | 53.6 |
| Total spine content (%, by weight) | 17.5 | 17.5 | 25.0 |

The data quoted in Table 1 are obtained after further processing in accordance with E-1 and testing in accordance with F 1-3.

Table 1

Properties of the moulding compositions according to the invention

| Example | 1 | 2 | 3 |
|---|---|---|---|
| Notched impact strength in kp/cm² | | | |
| DIN 53 543  20° C | 14.5 | 11.5 | 18.0 |
| −40° C | 6.0 | 5.0 | 8.0 |
| Impact strength in kp cm/cm² | | | |
| DIN 53 543  20° C | unbr.[1] | unbr.[1] | unbr[1] |
| −40° C | 85 | 70 | 115 |
| Ball indentation hardness kp/cm² | | | |
| DIN 53 546 | 900 | 1020 | 700 |
| Melt index g/10 minutes | | | |
| DIN 53 753 | 21 | 25 | 10 |
| Gloss assessment scale H - C | H | H | E |

[1]unbr. = unbroken

The moulding compositions according to the invention show high surface gloss and processibility, coupled with favourable toughness properties.

Comparison Examples A – C

The same components as in Examples 1 to 3 are used. The moulding compositions are adjusted to the same total rubber content as the moulding compositions according to Examples 1, 2 and 3.

| Comparison Example | A | B | C |
|---|---|---|---|
| Graft polymer B-3 (parts, by weight) | — | 29.2 | 41.6 |
| Graft polymer B-1 (parts, by weight) | 35 | — | — |
| SAN-copolymer (parts, by weight) | 65 | 70.8 | 58.4 |
| Total spine content (% by weight) | 17.5 | 17.5 | 25 |

The data set out in Table II are obtained after further processing in accordance with E-1 and testing in accordance with F-1, F-2, F-3:

Table II

| Comparison Examples | | A | B | C |
|---|---|---|---|---|
| Notched impact strength in kp cm/cm² | | | | |
| DIN 53 543 | 20° C | 3.0 | 11.0 | 16.0 |
| | −40° C | 2.7 | 4.3 | 4.5 |
| Impact strength in kp cm/cm² | | | | |
| DIN 53 543 | 20° C | 25 | unbr. | unbr. |
| | −40° C | 22 | 70.0 | 75.0 |
| Ball indentation hardness kp/cm² | | | | |
| DIN 53 546 | | 940 | 900 | |
| Melt index g/10 mins. | | | | |
| DIN 53 753 | | 6.5 | 12.0 | 8.5 |
| Gloss assessment scale H - A | | H | C | C |

EXAMPLE 4

A moulding composition of the following composition is prepared in accordance with D-1:
a. 12.5 parts, by weight, of graft polymer B-4,
b. 20 parts, by weight, of graft polymer B-1, and
c. 67.5 parts, by weight, of a styrene-acrylonitrile copolymer of 66 parts, by weight, of styrene and 34, parts, by weight, of acrylonitrile prepared in accordance with C-1 with the copolymer characteristics: $M\eta = 90{,}000$, $M_n = 38{,}000$, $U = 2.1$, acrylonitrile content = 32.1%

The data quoted in Table III are obtained after furher processing in accordance with E-1 and testing in accordance with F-1 and F-3.

EXAMPLE 5

The procedure is as in Example 4, except that graft polymer B-5 is used instead of graft polymer B-4.
The data obtained after further processing in accordance with E-1 and testing in accordance with F-1 to F-3 are set out in Table III under Example 5.

Comparison Example D

The procedure is as in Example 1 using graft polymers B-1 and B-3 and also the same quantitative ratios. The SAN-resin is replaced by a resin of the type which may be obtained, for example, by mixing different SAN-copolymers and which has the following data: $M\eta = 76{,}000$, $U = 6.3$ Working up and further processing are carried out in the same way as in Example 1. The test results are set out in Table III under column D.

Table III

| Example | | 4 | 5 | D |
|---|---|---|---|---|
| Notched impact strength in kp cm/cm² | | | | |
| DIN 53 543 | 20° C | 17.0 | 15.1 | 7.5 |
| | −40° C | 7.0 | 6.4 | 3.1 |
| Impact strength in kp cm/cm² | | | | |
| DIN 53 543 | 20° C | unbr. | unbr. | 75 |
| | −40° C | 90.0 | 102 | 58 |
| Ball indentation hardness kp/cm² | | | | |
| DIN 53 543 | | 880 | 872 | 900 |
| Melt index g/10 mins. | | | | |
| DIN 53 735 | | 21 | 20 | 19 |
| Gloss assessment scale H - A | | G | G | D |

It is clear from the data of Comparison Example D that styrene-acrylonitrile copolymers lying outside the range according to the invention lead to lower toughness values.

EXAMPLES 6 and 7 and COMPARISON EXAMPLES E and F

The starting products are:
1. graft polymer B-6;
2. graft polymer B-7; and
3. a styrene-acrylonitrile copolymer of 72 parts, by weight, of styrene and 28 parts, by weight, of acrylinitrile with an $M\eta$ -value of 70,500 and a molecular heterogeneity U of 2.5.

The following moulding compositions are prepared in accordance with D-1:

| Examples/Comparison Examples | 6 | 7 | E | F |
|---|---|---|---|---|
| Graft polymer B-6 (parts,by weight) | 15.4 | 11.5 | 26.9 | — |
| Graft polymer B-7 (parts,by weight) | 15.0 | 20.0 | — | 35 |
| SAN-copolymer (parts,by weight) | 69.6 | 68.5 | 73.1 | 65 |

The following data (Table IV) are obtained after further processing in accordance with E-1 and testing in accordance with F-1 to F-3:

Table IV

| Examples/Comparison Examples | 6 | 7 | E | F |
|---|---|---|---|---|
| Notched impact strength in kp cm/cm² DIN 53 543 20° C | 17.0 | 16.5 | 11.0 | 3.9 |
| Impact strength in kp cm/cm² DIN 53 543 | unbr. | unbr. | unbr. | 53 |
| Ball indentation hardness kp/cm² DIN 53 546 | 870 | 890 | 824 | 892 |
| Melt index g/10 mins. DIN 53 753 | 17 | 18 | 12.5 | 7.0 |
| Gloss assessment scale H - A | F | G | C | H |

EXAMPLE 8

A moulding composition is prepared in accordance with D-1 from:
12.5 parts, by weight, of graft polymer B-8;
15.0 parts, by weight, of graft polymer B-9; and
72.5 parts, by weight, of the styrene-acrylonitrile copolymer of Example 1.

The technological data quoted in Table V are obtained after processing in accordance with E-1 and further processing in accordance with F-1 to F-3.

EXAMPLE 9

A moulding composition of the following composition is prepared in accordance with D-1:

12.5 parts, by weight, of graft polymer B-10;
15.0 parts, by weight, of graft polymer B-1; and
72.5 parts, by weight of a copolymer of 69 parts, by weight, of α-methyl styrene and 31 parts, be weight, of acrylonitrile, prepared in accordance with C-1 with $M\eta = 60,000$, U = 1.9.

The data quoted in Table V, column heading 9, are obtained after working-up and further processing in the same way as described in E-1 and F.

EXAMPLE 10

The following moulding composition is prepared in accordance with D-1:
17.5 parts, by weight, of a graft polymer of 50 parts, by weight, of styrene-acrylonitrile (ratio by weight, 70 : 30) on 50 parts, by weight, of graft base A-1 which was prepared in accordance with formulation B-1 in the presence of 0.4 parts, by weight, of tert.-dodecyl mercaptan and which has a degree of grafting of 0.35;
17.5 parts, by weight, of graft polymer B-1; and
65.0 parts, by weight, of a styrene : acrylonitrile (75 : 25) copolymer obtained in accordance with C-2 with an $M\eta$ -value of 135,000 and a molecular heterogeneity U of 1.9.

Comparison Example G

The procedure is as in Example 10, except that a styrene-acrylonitrile copolymer with an $M\eta$ -value of 192,000 and an inconsistency factor U of 1.7 is used. The values obtained after working-up and further processing are set out in Table V, column heading G.

Table V

| Examples/Comparison Examples | 8 | 9 | 10 | G |
|---|---|---|---|---|
| Notched impact strength in kp cm/cm² DIN 53 543 20° C | 15.0 | 15.3 | 15.6 | 16.0 |
| Impact strength in kp cm/cm² DIN 53 543 20° C | unbr. | unbr. | unbr. | unbr. |
| Ball indentation hardness kp/cm² DIN 53 546 | 932 | 890 | 875 | 905 |
| Vicat value ° C DIN 53 460 | 97 | 109 | 97 | 97 |
| Melt index g/10 mins. DIN 53 753 | 23 | 12 | 20 | 6.5 |
| Gloss assessment scale H - A | G | E | G | B |

We claim:
1. A moulding composition comprising:
A. 6 to 30 parts, by weight, of a graft polymer of from 20 to 60 parts, by weight, of a mixture of styrene and acrylonitrile in a weight ratio of from 95 : 5 to 60 : 40 on from 80 to 40 parts, by weight, of a butadiene homo- or co-polymer having a butadiene content of at least 30%, an average particle diame- ter of from 0.26 to 0.65 $\mu$ and a grafting degree of from 0.15 to 0.7;

B. 14 to 45 parts, by weight, of a graft polymer of from 40 to 60 parts, by weight, of a mixture of styrene and acrylonitrile in a weight ratio of from 95 : 5 to 60 : 40 on from 60 to 40 parts, by weight, of a butadiene homo- or co-polymer having a butadiene content of at least 30%, an average particle diameter of from 0.05 to 0.25 $\mu$ and a grafting degree of from 0.4 to 0.9; and C. 25 to 80 parts, by weight, of a copolymer of styrene and/or $\alpha$-methyl styrene with acrylonitrile in a weight ratio of from 80 : 20 to 60 : 40 having an average molecular weight of from 50,000 to 200,000 and a molecular heterogeneity of from 4.5 to 1.0

2. A composition as claimed in claim 1 comprising:
A. 6 to 30 parts, by weight of a graft polymer of from 25 to 50 parts, by weight, of a mixture of styrene and acrylonitrile in a weight ratio of from 88 : 12 to 60 : 40 on from 75 to 50 parts, by weight, of a butadiene homo- or co-polymer having a butadiene content of at least 70%, an average particle diameter of from 0.3 to 0.55 $\mu$ and a grafting degree of from 0.25 to 0.70;

B. 14 to 45 parts, by weight, of a graft polymer of from 40 to 60 parts, by weight, of a mixture of styrene and acrylonitrile in a weight ratio of from 88 : 12 to 60 : 40 on from 60 to 40 parts, by weight of a butadiene homo- or co-polymer having a butadiene content of at least 70%, an average particle diameter of from 0.08 to 0.15 $\mu$ and a grafting degree of from 0.6 to 0.8; and C. 25 to 80 parts, by weight, of a copolymer of styrene and/or $\alpha$-methyl styrene with acrylonitrile in a weight ratio of from 75 : 25 to 60 : 40, having an average molecular weight of from 60,000 to 160,000 and a molecular heterogeneity of from 4.0 to 1.0

3. A composition as claimed in claim 2 in which the graft polymer component (A) contains a spine which has an average particle diameter of from 0.30 to 0.50 $\mu$ and a gel content of more than 85%; and the graft polymer component (B) contains a spine which has an average particle diameter of from 0.08 to 0.15 $\mu$ and a gel content of more than 85%.

4. A composition as claimed in claim 1 in which copolymer (C) has a styrene : acrylonitrile weight ratio of from 75 : 25 to 66 : 34, a viscosity average of the molecular weight of from 50,000 to 200,000 and a molecular heterogeneity of from 4.5 to 1.0.

5. A composition as claimed in claim 2 comprising:
A. 8.3 to 23.4 parts, by weight, of a graft polymer of from 35 to 50 parts, by weight, of a mixture of styrene and acrylonitrile in a weight ratio of from 88 : 12 to 60 : 40 on from 75 to 50 parts, by weight, of a butadiene homo- or co-polymer having a butadiene content of at least 70%, an average particle diameter of from 0.3 to 0.55 $\mu$ and a grafting degree of from 0.35 to 0.65;

B. 14.2 to 37.2 parts, by weight of a graft polymer of from 50 to 60 parts, by weight, of a mixture of styrene and acrylonitrile in a weight ratio of from 88 : 12 to 60 : 40 on from 50 to 40 parts, by weight, of a butadiene homo- or co-polymer having a butadiene content of at least 70%, an average particle diameter of from 0.08 to 0.15 $\mu$ and a grafting degree of from 0.65 to 0.8; and C. 39.6 to 77.5 parts, by weight, of a copolymer of styrene and/or $\alpha$-methyl styrene with acrylonitrile in a weight ratio of from 75 : 25 to 60 : 40, having an average molecular weight of from 60,000 to 160,000 and a molecular heterogeneity of from 4.0 to 1.0.

6. A composition as claimed in claim 2 in which the ratio of the total quantity of rubber introduced by graft polymer components (A) and (B) is selected in such a way that the quantity of rubber introduced by graft polymer component (A) is always less than 45% of the rubber total.

* * * * *